Figure 1:
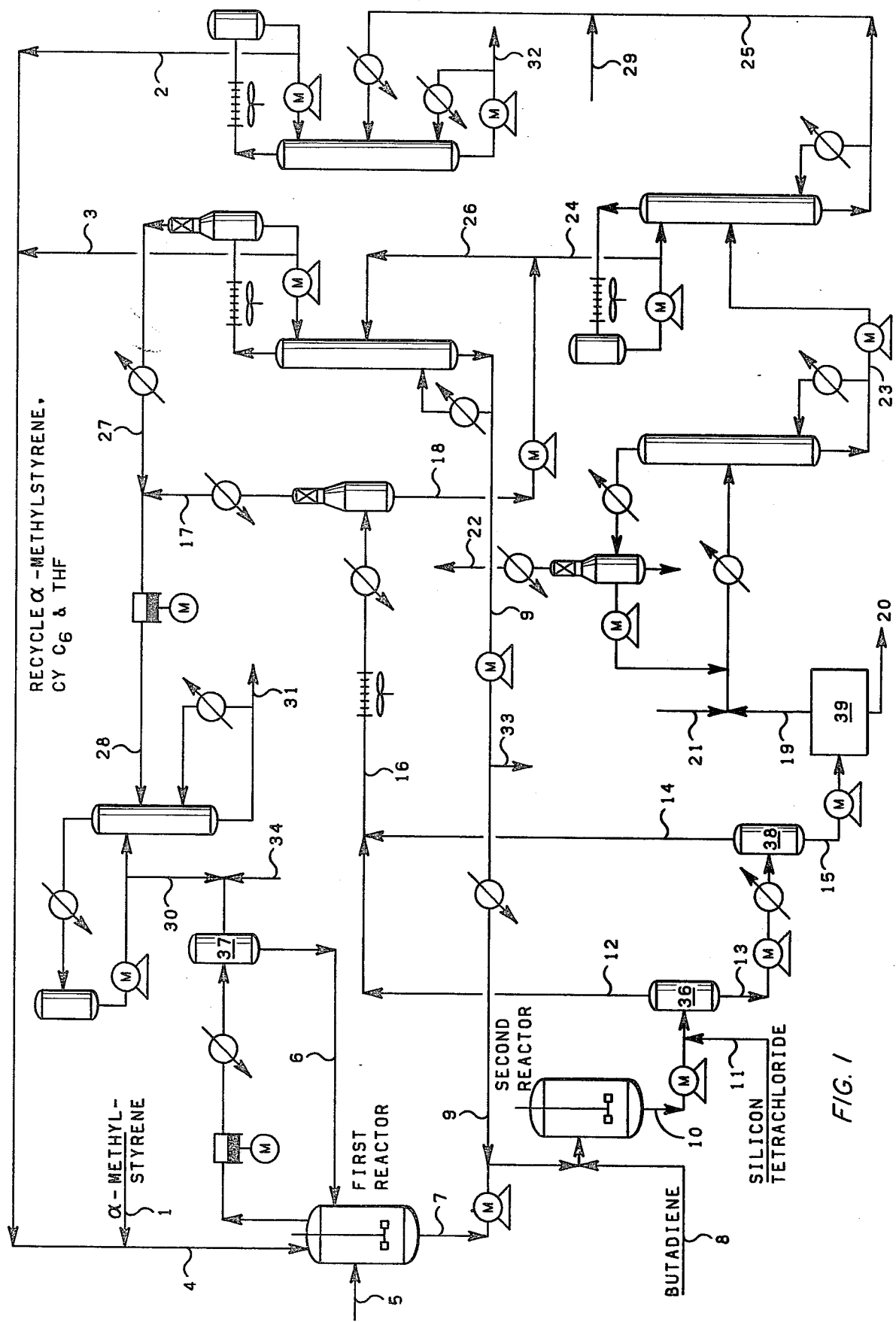

United States Patent [19]

Irvin et al.

[11] 4,232,137
[45] Nov. 4, 1980

[54] COOLING AN ALPHA-METHYLSTYRENE POLYMERIZATION MASS

[75] Inventors: Howard B. Irvin; Ronnie L. Lewis; George A. Moczygemba, all of Bartlesville, Okla.

[73] Assignee: Phillips Petroleum Company, Bartlesville, Okla.

[21] Appl. No.: 942,214

[22] Filed: Sep. 14, 1978

[51] Int. Cl. ............................................. C08F 2/06
[52] U.S. Cl. ........................... 526/71; 525/314; 526/70
[58] Field of Search ............... 260/880 B; 526/70, 71, 526/347.1

[56] References Cited

U.S. PATENT DOCUMENTS

| | | | |
|---|---|---|---|
| 2,823,198 | 2/1958 | Ridgway | 526/70 |
| 2,941,989 | 6/1960 | Ford | 526/347.1 |
| 3,669,947 | 6/1972 | Kahn | 526/347.1 |
| 3,817,962 | 6/1974 | Smith | 526/70 |
| 3,825,623 | 7/1974 | LaFlair | 260/880 B |
| 3,931,135 | 1/1976 | Asada | 526/70 |
| 4,058,652 | 11/1977 | Smith | 526/70 |

Primary Examiner—Paul R. Michl

[57] ABSTRACT

An alpha-methylstyrene polymerization reaction mass is cooled by including therein a component which is readily vaporizable under the conditions of polymerization thereby to remove undesirable or excess heat, thus controlling the reaction temperature to a desired value. In one embodiment a living polymer is produced followed by addition of a second monomer to the living polymer still in solution followed by polymerization onto the living polymer, forming a living block copolymer which is coupled with a linking agent.

9 Claims, 1 Drawing Figure

COOLING AN ALPHA-METHYLSTYRENE POLYMERIZATION MASS

This invention relates to a method for cooling a polymerization reaction mass. In one of its aspects it relates to the cooling of an alpha-methylstyrene polymerization reaction. In another of its aspects it relates to the production of a coupled, living block copolymer.

In one of its concepts the invention provides a method for controlling the temperature of a polymerization reaction mass, in which an alpha-methylstyrene is being polymerized to form a living polymer, by incorporating with the monomer and suitable diluent, a component which is readily vaporizable under the conditions under which the polymerization is being carried out. In another of its concepts the invention provides a method for producing such a polymer and ultimately a living block copolymer which is coupled by the said incorporation of the component which is readily vaporizable under conditions of the reaction, wherein said component is recovered for reuse.

It is well known in the art that block copolymers can be prepared by way of the "living-polymer method," also referred to as the "sequential addition method." According to one embodiment of this method, a block copolymer is prepared by first polymerizing a given monomer into a living polymer using a monofunctional anionic initiator, followed by adding a second monomer to the solution of said living polymer, the latter initiating the polymerization of the second monomer which polymerizes onto said previously formed living polymer. Finally the living block copolymer is coupled with any of the reactive multifunctional linking agents known in the art.

It has been demonstrated that the conversion of alpha-methylstyrene to polymer can be increased by carrying out the polymerization at low temperatures. This is due to the relatively high concentration of alpha-methylstyrene monomer at polymerization equilibrium, said concentration varying directly as a function of temperature. However, although cooling of the polymerization reaction mixture does increase monomer conversion, cooling does require higher energy costs, reduces the polymerization rate, thus requiring longer polymerization times and results in higher solution viscosity. This higher solution viscosity makes normal heat removal extremely difficult.

It is an object of this invention to provide a method for cooling a polymerization reaction. It is another object of the invention to provide a method for controlling the temperature of an alpha-methylstyrene polymerization reaction. It is a further object of the invention to provide a method for the production of a living polymer, followed by polymerization thereunto of a second monomer while the living polymer is still in solution, followed by coupling of the living block copolymer thus produced.

Other aspects, concepts, objects and the several advantages of this invention are apparent from a study of this disclosure, the drawing and the appended claims.

According to the invention there is provided a method for producing a polymeric mass from an alpha-methylstyrene which comprises preparing a solution of it in an inert diluent, the inner diluent comprising a proportion sufficient of a component readily vaporizable under the conditions of polymerization to remove undesirable or excess heat from the reacting mass by vaporization of at least a portion of said readily vaporizable component.

One class of block copolymers that can be prepared by the method of this invention has the general formula A-B-A, wherein A is a non-elastomeric polymer block and B an elastomeric polymer block. When the average molecular weights of the non-elastomeric polymeric blocks range between 2000 and 100,000 and that of the elastomeric polymer block between 15,000 and 250,000, these block copolymers, even in the unvulcanized state, possess properties comparable to the elastomeric properties of vulcanized conventional rubbers.

Conventional block copolymers of this type are built up of styrene and a conjugated diene, such as isoprene or butadiene. These polystyrene-polydiene-polystyrene block copolymers, however, have suffered the drawback that the elastomeric properties are quickly lost at elevated temperatures.

Previously it was demonstrated that block copolymers capable of withstanding higher temperatures could be obtained if the non-elastomeric polymer blocks A were composed of alpha-methylstyrene (AMS). Thus, it is possible to prepare a block copolymer of the structure poly(alpha-methylstyrene)-polydiene-poly(alpha-methylstyrene) by polymerizing alpha-methylstyrene into living poly(alpha-methylstyrene) by means of a monofunctional anionic initiator, then polymerizing a conjugated diene to form a block copolymer poly(alpha-methylstyrene)-polydiene, and finally adding a suitable linking agent. Although the products of this process possessed considerably better properties at elevated temperatures than conventional block copolymers of the type polystyrene-polydiene-polystyrene, the process had various serious drawbacks, related to the method of polymerizing the alpha-methylstyrene, which this invention overcomes.

The invention is especially suited to the preparation of alpha-methylstyrene-conjugated diene copolymers. The conversion of the alpha-methylstyrene to polymer, according to the invention, is accomplished without the need to use large heat transfer services. Further, the attendant fouling problems are eliminated.

According to this invention, the foregoing and other objects are achieved by first polymerizing alpha-methylstyrene with an organomonolithium initiator at about 5° C. in an inert hydrocarbon diluent containing an easily vaporizable component and a less easily vaporizable component. An activating agent, such as tetrahydrofuran is used. Then there is added to the polymerization mixture, which contains unpolymerized alpha-methylstyrene monomer, conjugated diene monomer sufficient for forming the conjugated diene block, optionally in a large amount of inert diluent, and a small amount of potassium alkoxide, raising the temperature of the polymerization mixture if desired to about 70° C. for polymerization of the conjugated diene and at least some of the residual alpha-methylstyrene, and finally, if desired, coupling of the living block copolymer with known linking agents such as silicon tetrachloride.

U.S. Pat. No. 2,527,768 issued Oct. 31, 1950, W. A. Schulze and John C. Hillyer, discloses a method for the polymerization of unsaturated materials with an alkali metal catalyst and employing in the process, to control the rate of the polymerization reaction and the viscosity of the polymer, a diluent which is preferably lower boiling than the diolefin there employed and, therefore, is caused to vaporize by absorbing the exothermic heat of the reaction. Thus, in the patent, by controlling the rate of addition of the monomers and the amount of diluent employed, it is possible to maintain the reaction temperature at a desired level.

U.S. Pat. No. 3,281,383, issued Oct. 25, 1966, Robert P. Zelinski and Henry L. Hsieh, discloses the preparation of polymers from monolithium-terminated polymers. The information of this patent serves as background to one skilled in the art studying the present disclosure.

The disclosures of the patents above mentioned are incorporated herein by reference.

Although alpha-methylstyrene is the presently preferred monomer, due to availability and relatively favorable economics, substituted alpha-methylstyrenes having one or more substituents on the aromatic ring are also suitable, said substituents being selected from alkyl, cycloalkyl, or aryl radicals, or combinations thereof, each having from one to eight carbon atoms per substituent. Non-limiting examples include: Alpha-methylstyrene, alpha-methyl-4-butylstyrene, alpha-methyl-3,5-di-t-butylstyrene, alpha-methyl-3,4,5-trimethylstyrene, alpha-methyl-4-benzylstyrene, alpha-methyl-4-cyclohexylstyrene, and the like. It is to be understood that mixtures of the described substituted alpha-methylstyrenes may be used.

Conjugated dienes having 4 to 12 carbon atoms per molecule are suitable for forming the elastomeric block of the copolymer. Examples of suitable conjugated dienes include isoprene, 1,3-butadiene, 2,3-dimethyl-1,3-butadiene, 2-methyl-1,3-pentadiene, 2,3-dimethyl-1,3-pentadiene, 2-methyl-3-ethyl-1,3-pentadiene, 2-phenyl-1,3-butadiene, and the like. The most preferred conjugated dienes are 1,3-butadiene and isoprene. Mixtures of conjugated dienes may be used.

Any of the hydrocarbon monolithium initiators known in the anionic solution polymerization art can be employed. Typically these can be represented by RLi wherein R is a hydrocarbon radical and can be aliphatic, cycloaliphatic, or aromatic, containing at least one carbon atom per molecule, the number of carbon atoms and consequently the molecular weight of the hydrocarbon lithium initiator is not limited as far as operability is concerned, though those of up to about 20 carbon atoms are readily available. Most frequently employed are the aliphatic monolithium types. Exemplary initiators include such as n-butyllithium, sec-butyllithium, n-decyllithium, phenyllithium, 1-naphthyllithium, p-tolyllithium, cyclohexyllithium, eicosyllithium, and the like.

The amount of initiator employed depends upon the polymer molecular weight desired and the concentration of initiator poisons in the feed streams and thus varies widely. Generally the amount of initiator is in the approximate range of 0.05 to 20 milliequivalents of lithium per 100 grams of total monomer.

In discussions hereinafter for simplicity and convenience alpha-methylstyrene will be used as representative as well as the preferred substituted or unsubstituted alpha-hydrocarbylstyrene.

Alpha-methylstyrene is polymerized as a concentrated solution in a suitable inert diluent comprising an easily vaporizable component and a less easily vaporizable component. The easily vaporizable component can be any hydrocarbon or non-hydrocarbon found to be inert to this reaction and having a boiling point lower than the monomers used. Examples of suitable readily vaporizable components are propane, ethane, propylene, and ethylene. Propane is currently the preferred diluent. The less easily vaporizable component includes any of the paraffinic, cycloparaffinic, or aromatic hydrocarbons known to the art, used alone or in admixture, typically of 4 to 10 carbon atoms per molecule. Exemplary species include such as n-hexane, n-heptane, cyclohexane, cyclopentane, benzene, toluene, the xylenes, 2,2,4-trimethylpentane, and the like. Cyclohexane currently is preferred for ease of handling, high solubility of polymer and availability. Monomer to diluent weight ratio can be within the broad range 9:1 to 1:5, preferably 5:1 to 1:2. Such a concentrated solution is desirable since the polymerization equilibrium, more particularly the extent of monomer conversion, is significantly influenced by the amount of diluent which is present. Specifically, higher solvent levels shift the equilibrium in the direction of more unreacted alpha-methylstyrene monomer.

The choice of polymerization temperature is influenced by the desired combination of solution viscosity, polymerization rate, and monomer conversion. A compromise is necessary since low temperature polymerization favors higher alpha-methylstyrene monomer conversion to polymer, but this is at the expense of polymerization rate and high solution viscosity. Polymerization of the alpha-methylstyrene is preferably conducted in the range of about 0° C. to about 40° C., more preferably about 5° C. to about 35° C. At higher temperatures undesirable side reactions occur and the percentage conversion which can be attained rapidly diminishes.

The pressure can be as convenient, although preferably a pressure is employed sufficient to maintain monomer and diluent substantially in the liquid phase.

The polymerization time can vary widely as may be convenient, and will, of course, be affected by the polymerization temperature chosen. Generally, alpha-methylstyrene is allowed to polymerize for less than 120 minutes, since, at longer polymerization times, termination of the living polymer occurs under the temperature and concentrations used according to this invention.

The polymerization of alpha-methylstyrene is preferably conducted in the presence of a polar activator, a small amount of polar activator increasing the polymerization or propagation rate of the alpha-methylstyrene without increasing the rate of the undesirable side reactions or termination reactions as long as relatively short polymerization times are employed (as described above). Activators suitable for this invention are polar compounds which do not contain an active hydrogen atom. These polar compounds may contain oxygen, sulphur, as well as nitrogen. Suitable compounds include ethers, thioethers, tertiary amines, and the like. It is preferred that the activator have a dielectric constant of between 2 and 9. Preferable activators are alphatic or cyclic ethers, such as dimethyl ether, diethyl ether, dimethoxyethane, bis(2-ethoxy-ethyl)ether, and tetrahydrofuran. Presently preferred is tetrahydrofuran.

Activator is normally added to the polymerization mixture in the amount of 0.5 to 10 parts by weight per 100 parts by weight of total monomers, preferably 1 to 5 parts.

In discussions hereinafter for simplicity and convenience butadiene is used as a representative as well as the preferred conjugated diene.

Butadiene polymerization involves two distinct sequential additions of said monomer in the improved process of the instant invention. The first addition involves only a small amount of butadiene which is added as a dilute solution in the inert polymerization diluent described above. This addition and subsequent polymerization of this small amount of butadiene is conducted at the same relatively low temperature used for polymerization of the alpha-methylstyrene block, and is for the purpose of "capping off" the poly(alpha-methylstyryllithium) to prevent depolymerization of the alpha-methylstyrene block upon raising the polymerization temperature and upon addition of the large amount of inert diluent, both conditions which are normally utilized for optimum formation of the butadiene block as described below. The small amount of butadiene added for capping the live poly(alpha-methylstyrene) is defined as an amount of at least 1 mole per mole of living polymer. The upper limit of this amount is not critical, but will usually be smaller than 100 moles, preferably smaller than 70 moles per mole of living polymer. The ratio of inert diluent to butadiene for the capping step is generally within the broad range of about 10:1 to 1000:1, preferably 20:1 to 50:1. The polymerization time for forming the butadiene cap is short in duration, about 1 to 120 minutes.

The second addition of butadiene is for the purpose of forming the poly(1,3-butadiene)block. It is normally advantageous to carry out this polymerization in the presence of additional amounts of inert hydrocarbon diluent in order to keep the reaction mixture at a sufficiently low viscosity. Likewise, it is normally advantageous to polymerize the butadiene at a higher temperature than that used for alpha-methylstyrene polymerization since higher temperatures favor a higher rate of reaction and also reduce the solution viscosity. The temperature of the polymerization mixture can safely be raised and additional diluent added without the occurrence of depolymerization after the poly(alpha-methylstyryllithium) has been secured by the capping step described above.

Polymerization of the butadiene is conducted in the presence of an alkali metal alkoxide. Especially suitable are potassium alkoxides, such as for example, potassium tertiary amyloxide. During the polymerization of the butadiene in the presence of potassium tertiary amyloxide and the tetrahydrofuran which is still present after having been added during the polymerization of the alpha-methylstyrene, residual unreacted alpha-methylstyrene is randomly copolymerized with the butadiene, thus substantially increasing the overall alpha-methylstyrene conversion.

The amount of alkali metal alkoxide added is such that the K:Li molar ratio is within the broad range of about 10:1 to about 1:10, preferably 5:1 to 1:5.

The temperature range normally employed for this step of the process is in the range of about 0° C. to about 140° C., preferably about 50° C. to about 120° C.

The amount of diluent to be added after capping the poly(alpha-methylstyryllithium) can vary widely and is for the purpose of convenience. Normally sufficient diluent is added such that the ratio of total weight of diluent to total weight of monomers added in all steps of the polymerization process is about 3:1 to about 25:1, more preferably about 5:1 to about 10:1.

The polymerization time for formation of the butadiene block is normally in the range of about 2 minutes to several hours, preferably 5 minutes to 30 minutes.

If desired the living alpha-methylstyrene-butadiene copolymer can be coupled. In our use of the term coupling as herein employed, the term is a broad generic term meaning the bringing together and joining by means of central coupling atoms or a coupling moiety, two or more of the living lithium-terminated polymer chains.

The compounds, catalysts, modifier and other ingredients and operating conditions suitable for preparing the initial copolymer of the coupling reaction are well known in the art. See for example, U.S. Pat. No. 3,281,383 above mentioned. The operation can be batchwise, incrementally or continuously effected.

The coupling reaction is normally conducted at the same temperature as employed for formation of the polybutadiene block, this being broadly from about 0° to 140° C., preferably from about 50° C. to about 120° C. Time for the coupling reaction can range from a few minutes to several hours, preferably from about one minute to 30 minutes.

The addition of a volatile inert solvent, such as propane, to an AMS batch reactor, to supply the cooling requirements by its boiling in the reactor, has the advantage of (1) allowing operation at a low temperature (~5° C.) at which reaction equilibrium is favorable, (2) dilution of the reactor to be minimized so that a high solids (~40 wt. %) rubber solution can be made, favoring high monomer conversion and (3) heat transfer surface can be small since it is applied only against condensing propane.

For a typical polymerization run, effluent from the second reactor is about 14.5% solids; this solution is concentrated to about 27% by flashing before passing to conventional steam stripping.

Example I illustrates that the presence of 9 parts of propane in the reactor recipe lowers conversion only slightly. Example II, together with the figure and material balance, illustrates a method for employing the invention on a commercial scale.

EXAMPLE I

This example illustrates that the substitution of propane for part of the cyclohexane in the alpha-methylstyrene polymerization does not appreciably affect the equilibrium conversion.

The monomer, solvent and catalyst were charged to ten ounce beverage bottles according to the recipe given, cooled to 5° C. and agitated in a liquid bath for the time specified. The product was coagulated with alcohol according to methods well known in the art, dried and weighed to determine conversion.

|  | Sample # | | | | |
| --- | --- | --- | --- | --- | --- |
|  | 1 | 2 | 3 | 1a | 2a |
| Recipe, Parts by Weight | | | | | |
| Alpha-methylstyrene | 40 | 40 | 40 | 40 | 40 |
| Cyclohexane | 25 | 25 | 25 | 16 | 16 |
| Propane | — | — | — | 9 | 9 |
| Tetrahydrofuran | 1 | 1 | 1 | 1 | 1 |
| n-Butyllithium | 0.13 | 0.13 | 0.13 | 0.13 | 0.13 |
| Reaction Time, Minutes | 30 | 45 | 60 | 30 | 60 |
| Polymer yield, Parts by Weight | 30.6 | 36.0 | 35.9 | 23.1 | 34.9 |
| Conversion of Alpha-Methylstyrene, % | 76 | 90 | 90 | 58 | 87 |

EXAMPLE II

The use of this invention in a large scale operation can best be described by reference to the Figure. Fresh alpha-methylstyrene 1 is combined with recycled alpha-methylstyrene 2 contained in cyclohexane and recycled tetrahydrofuran 3 and passed to a first reactor where the alpha-methylstyrene is polymerized with the aid of n-butyllithium catalyst 5. The heat of reaction is removed and the temperature of the reactor is maintained at 5° C. by the addition of propane 6 most of which is vaporized, passed overhead to a compressor and condenser and stored for recycle at 37. A portion of the propane, an amount determined by the reactor temperature and pressure only, remains in the liquid phase and passes out with the polymerized alpha-methylstyrene by 7. Butadiene is added to the reaction mixture via stream 8, additional solvent is added by 9, and the mixture is passed to a second reactor wherein butadiene polymerization reaction is carried out. This reaction product leaves the reactor by 10, silicon tetrachloride is added by 11 and the mass is flashed at 36. Rubber product 13 is subsequently heated and further flashed at 38 and the flashed material is stripped with steam at 39 to remove final traces of solvent, and removed for further processing as a solvent-free product stream 20. The THF-cyclohexane overhead product stream 24. This latter stream is combined with flash condensate recovered from reactor effluent flashing, stream 18, and further fractionated to yield a THF concentrate overhead product, stream 3, for recycle to the AMS reactor and recycle cyclohexane solvent, stream 9, for recycle to the butadiene reactor. Stream 25 is combined with a naphtha chaser and distilled to remove heavies along with the naphtha as bottoms, stream 32, and to isolate the AMS concentrate, stream 2, for recycle to the AMS reactor. Butene impurities entering the system with the butadiene along with unvaporized propane remaining in the reactor effluent are recovered in the vents from the flash accumulator, stream 17, and from the THF column accumulator, stream 27. These vapors, stream 28, are compressed and fed to a recovery column from which propane recycle, stream 30, is yielded overhead and butenes concentrate, stream 31, produced as a kettle product.

10,000 LT/YR RUBBER
MATERIAL BALANCE LBS/DAY (16 BATCHES/DAY)

| Stream No.:<br>Description: | 1<br>AMS<br>Feed | 2<br>Recycle<br>AMS | 3<br>Recycle<br>THF | 4<br>Net AMS<br>Reactor<br>Feed | 5<br>Catalyst<br>to Reactor 1 | 6<br>Propane<br>Coolant | 7<br>Reactor 1<br>Effluent | 8<br>Butadiene<br>Feed | 9<br>Recycle<br>Cy-C6 | 10<br>Reactor 2<br>Effluent |
|---|---|---|---|---|---|---|---|---|---|---|
| Butadiene | — | — | — | — | — | — | — | 43200 | — | — |
| Butenes | — | — | — | — | — | 2 | — | 216 | — | 218 |
| AMS | 28872 | 7200 | — | 36072 | — | — | 7272 | — | 100 | 7372 |
| AMS Impurities | 291 | — | — | 291 | — | — | 291 | — | — | 291 |
| Cyclohexane | — | 16517 | 9920 | 26437 | 763 | — | 27200 | — | 459200 | 486400 |
| THF | — | — | 1972 | 1972 | — | — | 1972 | — | 12 | 1984 |
| N-Butyllithium | — | — | — | — | 135 | — | 135 | — | — | 135 |
| Polymer | — | — | — | — | — | — | 28800 | — | — | 72000 |
| SiCl4 | — | — | — | — | — | — | — | — | — | — |
| Propane | — | — | — | — | — | * | 5400 | — | — | 5400 |

| Stream No.:<br>Description: | 11<br>SiCl4 | 12<br>Letdown<br>OVHD'S | 13<br>Letdown<br>Bottoms | 14<br>Flash<br>OVHD'S | 15<br>Flash<br>Bottoms | 16<br>Combined<br>OVHD'S | 17<br>Flash<br>Accumulator<br>Vent | 18<br>Flash<br>Condensate | 19<br>Stripper<br>OVHD'S | 20<br>Stripper<br>Bottoms |
|---|---|---|---|---|---|---|---|---|---|---|
| Butadiene | — | — | — | — | — | — | — | — | — | — |
| Butenes | — | 109 | 109 | 101 | 8 | 210 | 148 | 62 | 8 | — |
| AMS | — | — | 7372 | 75 | 7297 | 75 | — | 75 | 7225 | 72 |
| AMS Impurities | — | — | 291 | — | 291 | — | — | — | 201 | 90 |
| Cyclohexane | — | 44387 | 442013 | 260616 | 181397 | 305003 | 5 | 304998 | 181397 | — |
| THF | — | 277 | 1707 | 1197 | 510 | 1474 | — | 1474 | 510 | — |
| N-Butyllithium | — | — | 135 | — | 135 | — | — | — | — | 135 |
| Polymer | — | — | 72000 | — | 72000 | — | — | — | — | 72000 |
| SiCl4 | 95 | — | 95 | — | 95 | — | — | — | — | 95 |
| Propane | — | 3717 | 1683 | 1627 | 56 | 5344 | 4500 | 844 | 56 | — |
| H2O | | | | | | | | | | 1128000 |
| Naphtha | | | | | | | | | | |

| Stream No.:<br>Description: | 21<br>Cy-C6<br>Make-<br>up | 22<br>Drying<br>Col.<br>Vent | 23<br>Drying<br>Col.<br>Effl. | 24<br>AMS-CyC6<br>Col.<br>OVHDS | 25<br>AMS-CyC6<br>Col. Btms. | 26<br>THF<br>Col.<br>Feed | 27<br>THF<br>Col.<br>Vent | 28<br>C3-C4<br>Col.<br>Feed | 29<br>Naph-<br>tha<br>Chaser | 30<br>Pro-<br>pane<br>Recycle | 31<br>But-<br>ene<br>Product | 32<br>Heavies | 33<br>Solvent<br>Losses | 34<br>Makeup<br>Propane |
|---|---|---|---|---|---|---|---|---|---|---|---|---|---|---|
| Butadiene | — | — | — | — | — | — | — | — | — | — | — | — | — | — |
| Butenes | — | 8 | — | — | — | 62 | 62 | 210 | — | 2 | 208 | — | — | — |
| AMS | — | — | 7225 | 25 | 7200 | 100 | — | — | — | — | — | — | — | — |
| AMS Impurities | — | — | 201 | — | 201 | — | — | — | — | — | — | 201 | — | — |
| Cyclohexane | 3609 | 2 | 185004 | 168487 | 16517 | 473485 | — | 5 | — | — | — | — | 4365 | — |
| THF | — | — | 510 | 510 | — | 1984 | — | — | — | — | — | — | — | — |
| N-Butyllithium | — | — | — | — | — | — | — | — | — | — | — | — | — | — |
| Polymer | — | — | — | — | — | — | — | — | — | — | — | — | — | — |
| SiCl4 | — | — | — | — | — | — | — | — | — | — | — | — | — | — |
| Propane | — | 56 | — | — | — | 844 | 844 | 5344 | — | 5340 | 4 | — | — | — |
| H2O | | | | | | | | | | | | | | |
| Naphtha | | | | | | | | | 9150 | | | 9150 | — | — |

*As required for temperature control. 3500 LBS/HR Max.

solvent and unreacted AMS recovered in the steam strippers 19 plus cyclohexane makeup 21 are dried by fractionation and further distilled to recover an alpha-methylstyrene concentrate bottoms, stream 25, and a Reasonable variation and modification are possible within the scope of the foregoing disclosure, drawing and the appended claims to the invention the essence of which is that an alpha-methylstryene polymerization reaction is controlled by cooling the same employing in the usual diluent a component which is readily vaporizable under the conditions of reaction desired to be maintained; and that a process for the production of a final coupled living block copolymer, as described, has been set forth.

We claim:

1. A method for producing a polymeric mass from an alpha-methylstyrene which comprises preparing a solution of it in an inert diluent, the inert diluent having two components other than said alpha-methyl styrene and being composed of at least one solvent of a character and present in the solution in an amount sufficient to maintain a polymer when produced in solution in the polymeric mass and a liquid component which is readily vaporizable under the desired conditions of polymerization, said component being of a character and being present in an amount such as to remove by vaporization of at least a portion thereof undesirable or excess heat from the reaction mass and then producing said mass under polymerization conditions including the vaporization of said portion of said component.

2. A method according to claim 1 wherein the diluent is at least 1 selected from n-hexane, n-heptane, cyclohexane, cyclopentane, benzene, toluene, xylenes, and 2,2,4-trimethylpentane and said component which is readily vaporizable is selected from propane, ethane, propylene, and ethylene.

3. A method according to claim 1 wherein the diluent is cyclohexane and the component which is readily vaporizable is propane.

4. A method according to claim 1 wherein the polymeric mass still containing diluent and some of said component is admixed with a conjugated diene and in presence of a coupling agent a block copolymer is produced, readily vaporizable component is removed from the final reaction mass thus obtained for reuse in producing said polymeric mass.

5. A method according to claim 1 wherein said alpha-methylstyrene is selected from it and substituted alpha-methylstyrenes having 1 or more substituents on the aromatic ring, said substituents being selected from alkyl, cycloalkyl, aryl radical and combinations thereof, each having 1—8 carbon atoms per substituent and the polymerized mass is admixed with a conjugated diene and in presence of a coupling agent a block copolymer is produced, readily vaporizable component is recovered from the final reaction mass thus obtained for reuse in producing said polymeric mass.

6. A method according to claim 5 wherein the conjugated diene is one having 4—12 carbon atoms per molecule.

7. A method according to claim 6 wherein the conjugated diene is selected from 1,3-butadiene, 2,3-dimethyl-1, 3-butadiene, 2-methyl-1,3-pentadiene, 2,3-dimethyl-1,3-pentadiene, and 2-phenyl-1,3-butadiene.

8. A method according to claim 5 wherein a block copolymer is produced by polymerizing the alpha-methylstyrene in solution and in presence of said component with aid of a monofunctional anionic initiator, into a living polymer in solution, conjugated diene is then added to the solution, the living polymer initiating polymerization of the diene, wherein the living block copolymer is coupled with a reactive multifunctional linking agent, and wherein vaporizable component is recovered from the final reaction mass thus obtained for reuse in producing said polymeric mass.

9. A method according to claim 1 wherein an alpha-methylstyrene dissolved in a diluent comprising a component which is readily vaporizable under desired conditions of reaction is polymerized with the aid of a catalyst to produce a living polymer, the temperature of the reacting mass being controlled with aid of said vaporizable component, some of it being allowed to vaporize to remove heat from said mass, wherein a conjugated diene is then added to the mass to polymerize the same and a coupling agent is used to couple living block copolymer thus produced to form said block copolymer; and wherein additional component is recovered from the final reaction mass thus obtained for reuse in the method.

* * * * *